United States Patent [19]

Hoffman

[11] Patent Number: 4,821,669
[45] Date of Patent: Apr. 18, 1989

[54] FLIGHT INSTRUMENT FLAG ANNUNCIATOR

[75] Inventor: Joe T. Hoffman, Phoenix, Ariz.

[73] Assignee: Honeywell, Inc., Minneapolis, Minn.

[21] Appl. No.: 126,311

[22] Filed: Nov. 30, 1987

[51] Int. Cl.⁴ .......................................... G01D 13/00
[52] U.S. Cl. ......................................... 116/45; 116/43
[58] Field of Search ................... 116/42, 43, 302, 303, 116/45; 40/470, 476

[56] References Cited

U.S. PATENT DOCUMENTS

| | | | |
|---|---|---|---|
| 1,245,731 | 11/1917 | Jones | 116/43 |
| 1,291,928 | 1/1919 | Koehler | 116/43 |
| 1,379,503 | 5/1921 | Kennedy et al. | 116/43 |
| 1,397,463 | 11/1921 | Squier | 116/43 |
| 1,457,260 | 5/1923 | Mason | 116/43 |
| 1,463,997 | 8/1923 | Hearn et al. | 116/43 |
| 1,529,443 | 3/1925 | McBeau | 116/43 |
| 1,751,206 | 3/1930 | Hueller | 116/43 |
| 2,097,056 | 10/1937 | Briezhle | 116/43 |
| 2,329,782 | 9/1943 | Panissidi | 116/42 |
| 2,858,643 | 11/1958 | Snauley | 40/470 |

FOREIGN PATENT DOCUMENTS 640943  5/1962  Canada .............................. 116/129

Primary Examiner—Allan N. Shoap
Assistant Examiner—Thomas B. Will
Attorney, Agent, or Firm—Howard Paul Terry

[57] ABSTRACT

A flight instrument flag annunciator has a motor, a flag mechanism having a flag shutter driven by the motor, a tension spring for rotating the flag shutter in a counter-clockwise direction, a drive cord connected to the motor for rotating the flag shutter in a clockwise direction, support members for supporting the motor and the flag mechanism, and guide members for guiding the drive cord between the motor and the flag mechanism.

2 Claims, 1 Drawing Sheet

FLIGHT INSTRUMENT FLAG ANNUNCIATOR

BACKGROUND OF THE INVENTION

The invention relates to a flight instrument flag annunciator, and in particular, the invention relates to a flight instrument flag annunciator having a motor and cord drive.

The prior art flight instrument flag annunciator includes a flag mechanism having a fixedly mounted display drum and having a flag shutter rotatable through an angle relative to the drum, a motor for driving the flag shutter, and a gear mechanism interconnecting the flag shutter and the motor.

A problem with the prior art flag annunciator is that maintenance and replacement of the motor is relatively difficult, because the motor is mounted adjacent to the flag mechanism.

SUMMARY OF THE INVENTION

According to the present invention, a flight instrument flag annunciator is provided. The flag annunciator includes a flag mechanism having a fixedly mounted display drum and having a flag shutter rotatable through an angle relative to the drum, a motor for driving the flag shutter, and a cord subassembly interconnecting the shutter and the motor.

By using the cord subassembly, in place of the gear mechanism, it overcomes the problem of difficulty of maintenance and replacement of the motor, which can be placed in an easily acceasible location.

The above advantages and subsequent description will be more easily understood by reference to the following drawings.

DESCRIPTION OF THE PREFERRED EMBODIMENT

Figure 1:
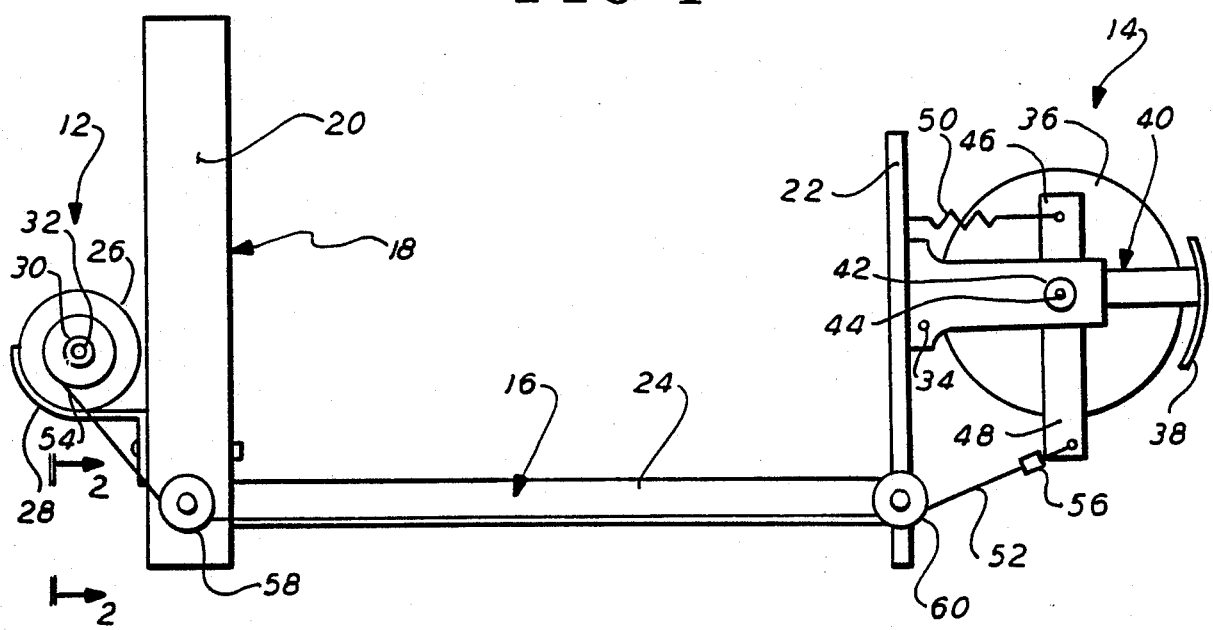
FIG. 1 is a schematic elevation view of a flag annunciator according to the present invention.

In FIG. 1, a flight instrument flag annunciator 10 is shown. Annunciator 10 includes a motor 12, a flag mechanism 14, an actuating means 16, and a support means 18.

Support means 18 includes a first mounting plate 20 for supporting motor 12, a second mounting plate 22 for supporting flag mechanism 14, and a bracing plate 24 disposed between and fixedly connected to plates 20, 22.

Motor 12 includes a stator 26, a mounting bracket 28 fixedly connecting stator 26 to plate 20, and a rotor shaft 30 with a rotation axis 32.

Flag mechanism 14 includes a base member 34 fixedly connected to plate 22, a display drum 36 fixedly connected to base member 34, a flag shutter 38, and a shutter support 40.

Shutter support 40, which supports flag shutter 38, is rotatably connected to base member 34. Shutter support 40 has a shaft 42 with a rotation axis 44. Shaft 42 is supported by base member 34.

Shutter support 40 has an upper arm 46 and a lower arm 48. Plate 22 acts as a stop for lower arm 48 in the clockwise movement of arm 48 and shutter 38. A stop (not shown) is provided for the counterclockwise movement.

Shutter support 40 moves from a non-display position through an angle to a display position in a clockwise rotation, and moves from the display position back to the non-display position in a counterclockwise rotation The non-display position is shown in FIG. 1.

Actuating means 16 includes a tension spring 50 for providing counterclockwise movement of shutter 38, a drive cord 52, such as a Kevlar cord, for providing clockwise movement of shutter 38, and a pulley 54 fixedly connected to shaft 30 for driving Kevlar cord 52. Kevlar cord is manufactured by E. I. Dupont de Nemours & Co., Textile Fibers Department, Kevlar Special products, Centre Road Building, Wilmington, Del. 19898.

Spring 50 is connected at one end thereof to plate 22, and is connected at the other end thereof to upper arm 46.

Cord 52 is connected at one end thereof to pulley 54, and is connected at the other end thereof to arm 48. Cord 52 has a termination hook 56 for connection to arm 48. Cord 52 is disposed approximately in a single plane.

Cord 52 also has a first cord guide 58 mounted on plate 20, and a second cord guide 60 mounted on plate 22. Guide 60 is the same construction as guide 58.

Figure 2:
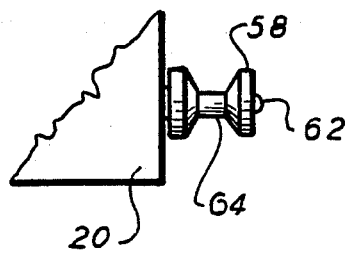
FIG. 2 is a partial elevation view as taken along the line 2—2 of FIG. 1 showing a cord guide.

In FIG. 2, guide 58, which is a roller member, has a pin 62, which is fixedly connected to plate 20 for rotation of roller 58 relative to pin 62. Roller 58 has a groove 64 for receiving cord 52, which is not shown in FIG. 2.

Figure 3:
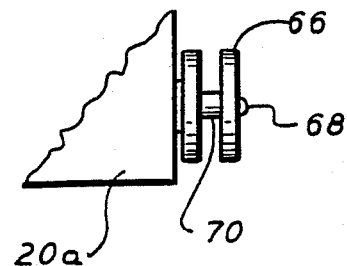
FIG. 3 is a view corresponding to FIG. 2 showing an alternate embodiment of a cord guide.
Figure 4:
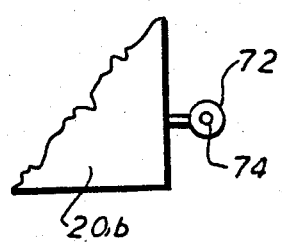
FIG. 4 is a view corresponding to FIG. 2 showing another alternate embodiment of a cord guide.
Figure 5:
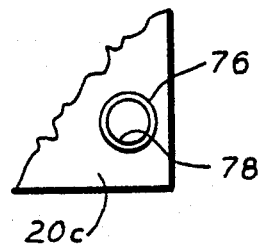
FIG. 5 is a view corresponding to FIG. 2 showing still another alternate embodiment of a cord guide.

Parts of FIGS. 3, 4 and 5, which are the same as the corresponding part of FIG. 2, have the same numeral, but with a respective subscript added thereto.

In FIG. 3, which shows an alternate form of construction to that of FIG. 2, a cord guide 66 is provided. Guide 66 has a pin 68, which is fixedly connected to plate 20a. Guide 66 is a pulley member, which has a groove 70 for receiving the cord.

In FIG. 4, which shows an alternate form of construction to that of FIG. 2, a cord guide 72 is provided. Guide 72 is an eyelet member, which is fixedly connected to plate 20b. Eyelet 72 has an opening 74 for receiving the cord.

In FIG. 5, which shows an alternate form of construction to that of FIG. 2, a cord guide 76 is provided. Guide 76 is a bushing member, which is fixedly connected to plate 20c. Bushing 76 has an opening 78 for receiving the cord.

It is noted that the objective for selecting guide 58 is to utilize a method to obtain a minimum amount of friction for an individual application.

The assembly of parts of actuating means 16 is indicated hereafter. Nylon pulley 54 is attached to motor 12 via a press fit or other suitable method. The motor 12 is then attached to mounting plate 20 in a remote, easily accessible area with bracket 28. A length of cord 52 should be cut to length to accommodate the particulars of the individual mechanism. Care should be taken to allow at least ½ of a pulley rotation of slack in the length of cord 52. This will allow motor 12 to gain kinetic energy before tensioning of cord 52 occurs. One end of cord 52 should be terminated with a ferrule and hook 56, suitable for attaching to the flag support 40. After cord 52 is routed through the indicator 14 via cord guide 60, it should be attached to pulley 54 with an adhesive or other suitable means. Hook 56 is then attached to flag support 40, which actuates over display drum 36. Return spring 50 is attached to both the flag support 40, and mounting plate 22.

A voltage of either polarity, for a two position flag annunciator 10 only, will actuate motor 12 and pulley 54. As motor 12 rotates, it temporarily gains kinetic energy while pulley 54 removes slack from the cord 52. Upon tensioning of cord 52, motor 12 continues to wrap the cord 52 around pulley 54 until the flag shutter 38 comes to rest on its stop 22. After flag 38 hits its stop 22, the cord stretches a small amount and brings rotor 32 of motor 12 to a semi-soft stop. Removal of the excitation voltage from motor 12 allows return spring 50 to return flag 38 to its in-view position to obscure the display drum 36 and return the cord slack to its initial position.

Annunciator 10 according to the present invention has certain advantages as indicated hereafter. Motor and cord driven flag annunciator 10 differs form the prior art motor and gear driven annunciator, in the mechanical coupling between motor 12 and flag 14. Cord actuating means 16 utilizes flexible cord 52 in lieu of a gear between the motor 12 and flag 14. This concept offers many advantages in the areas of cost, packaging, and reliability. Cost advantages include the elimination of expensive gear plates, gears, mounting brackets, counter balances, bearings, collars, and their associated problems. The primary packaging advantage is cord 52 allows motor 12 to be remotely located in easily accessible areas. This provides far better space management and allows easier access to other instrument components. Reliability benefits include the elimination of interference and sticky operation problems Elimination of gear center distances eliminates interference problems between mating gears. Sticky operation is reduced due to increased available torque. The increased torque results from slack in cord 52 allowing motor rotor 30 to rotate approximately ½ of a turn before tensioning the cord 52. This allows an additional kinetic energy component to be added to the torque available from the motor in its dead start mode which is used in the gear driven mechanism. The cord 52 also acts as a shock absorber when it stretches a small amount as the flag 38 hits its stop 22. This prevents the rotor 30 of the motor 12 from slamming against a hard stop and implying a shock load to the motor bearings.

In summary, it is noted that the motor and cord driven flag annunciator 10 is a less expensive, more reliable, and easier to package concept than the prior art motor and gear driven flag annunciator. Simplicity in the components used and their operating procedures are the major advantages over the prior art motor and gear driven annunciator. Fewer parts of a simpler design result in increased reliability and higher productivity due to decreased parts cost and assembly time.

While the invention has been described in its preferred embodiments, it is to be understood that the words which have been used are words of description rather than limitation and that changes may be made within the purview of the appended claims without departing from the true scope and spirit of the invention in its broader aspects.

The embodiments of an invention in which an exclusive property or right is claimed is defined as follows:

1. A flight instrument flag annunciator comprising:
   a motor having a stator and a rotor rotatable relative to the stator about a motor axis;
   a drive pulley driven by and coaxial with the rotor;
   a slack stretchable cord having a first end portion fixedly connected to the drive pulley and having a second end portion;
   guide means for guiding the slack stretchable cord;
   a flag mechanism having a flag shutter rotatable relative to a display drum and a base member about a flag mechanism axis, said flag shutter having a first arm connected to the slack cord second end portion and having a second arm; and
   a spring having a first end portion connected to the second flag shutter arm and having a second end portion connected to the flag mechanism base member; wherein
   said flag mechanism axis is substantially parallel to said motor axis; and wherein
   said slack stretchable cord is disposed adjacent to a plane, said plane being normal to said motor axis and said flag mechanism axis for applying a tension force of gradually increasing amount through the cord while slack is being taken up in the cord by the drive pulley whereby a shock load on the shutter and on the cord is avoided by a slack takeup and a shock load on the shutter when stopped is avoided by a cord stretching.

2. The annunciator of claim 1, wherein said motor has a motor support member and said flag mechanism has a flag mechanism support member and wherein a compression brace is connected to the motor support member at one end thereof and to the flag mechanism support member at the other end thereof, said compression brace being disposed adjacent to and substantially parallel to said slack stretchable cord so that a tension force in the cord is balanced by a corresponding compression force in the compression brace whereby the annunciator balances out its internal forces and avoids transmittal of shock loads to a flight vehicle.

* * * * *